United States Patent Office 3,436,196
Patented Apr. 1, 1969

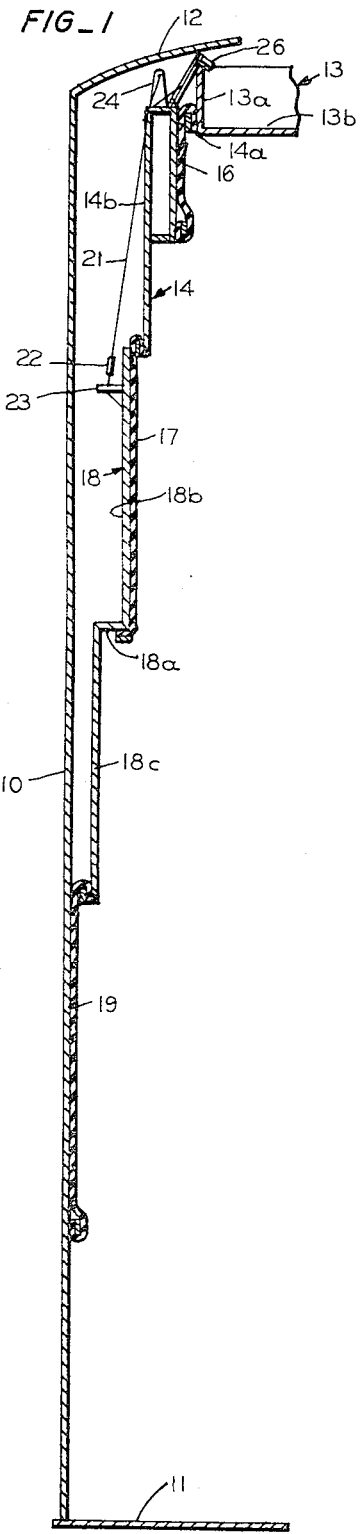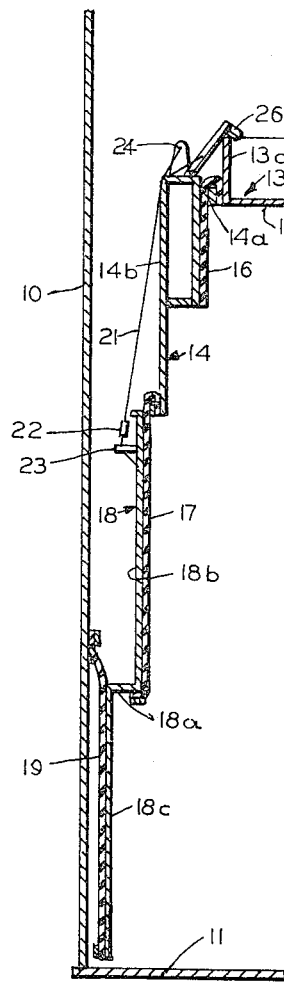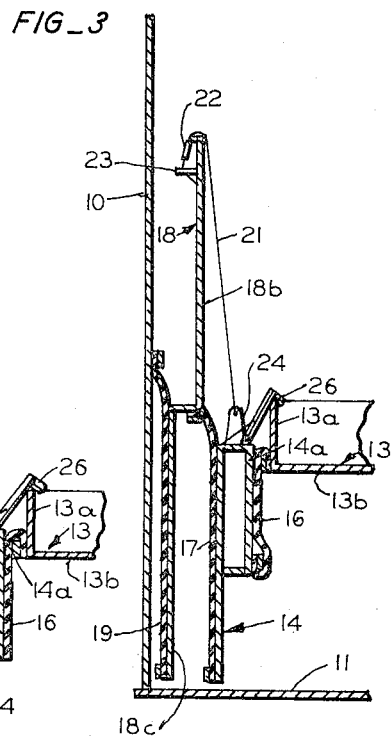

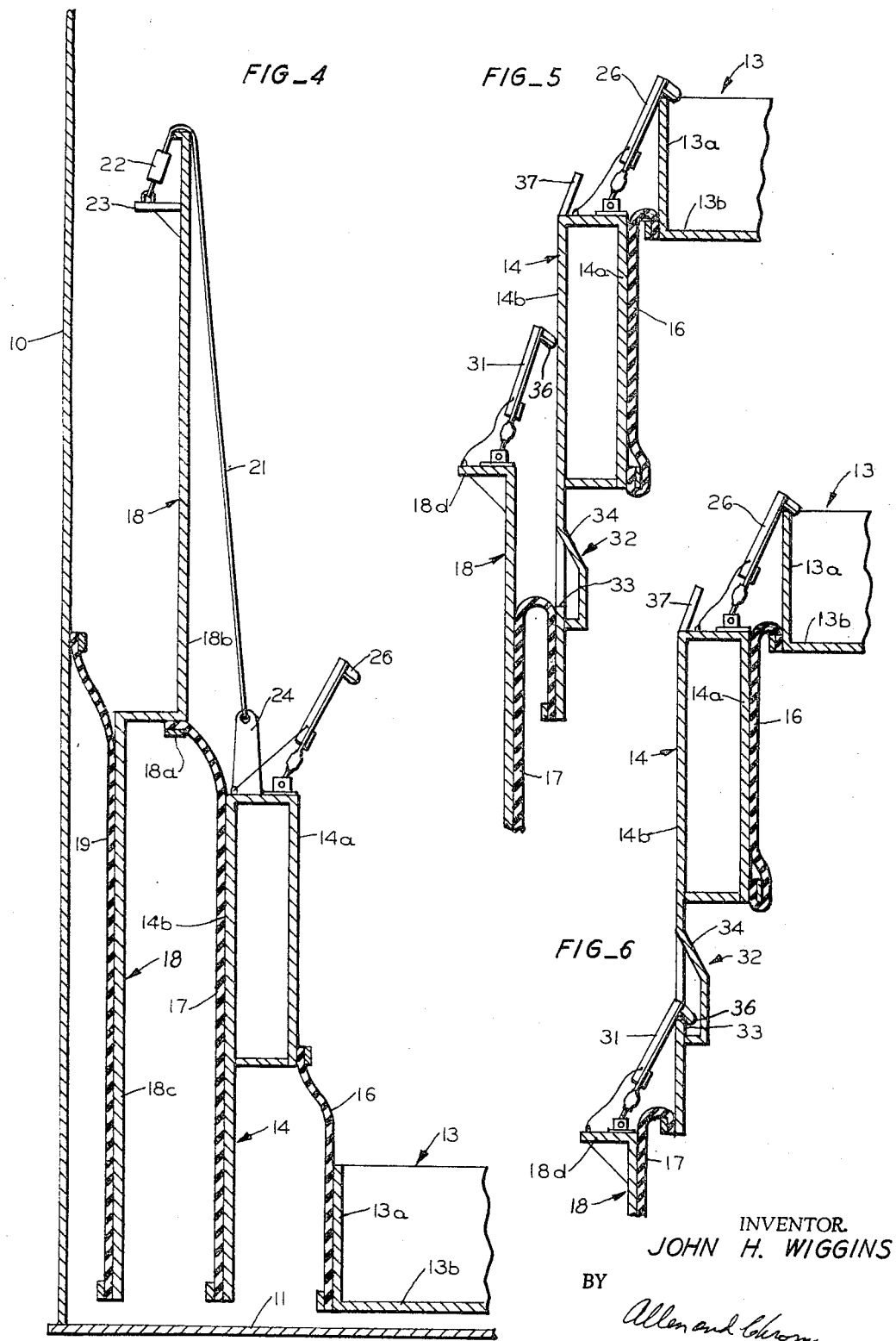

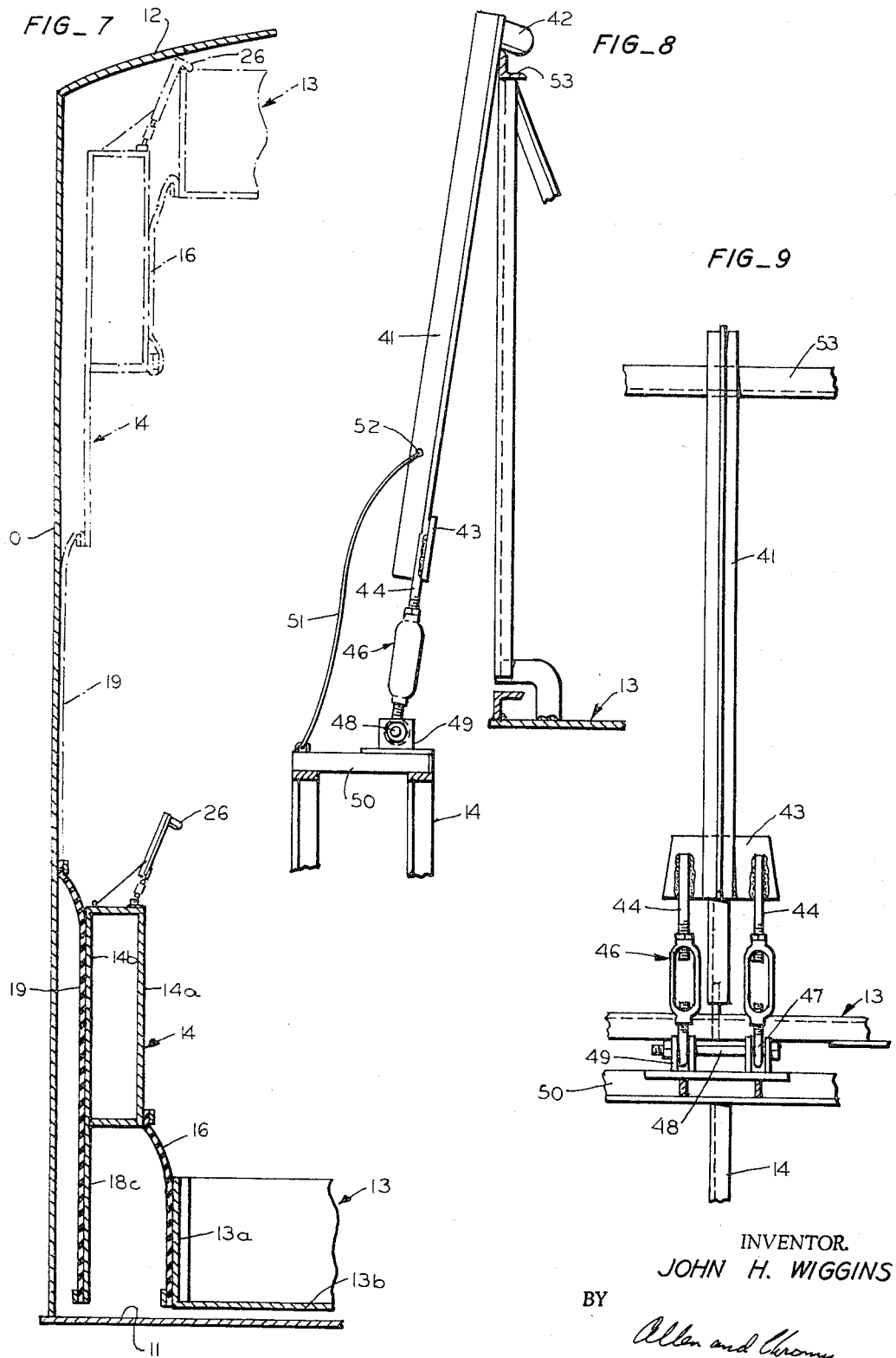

3,436,196
DRY-SEAL PRESSURE-TYPE GASHOLDER PROVIDED WITH HOOK LIFT STRUCTURES
John H. Wiggins, P.O. Box 418, Menlo Park,
Calif. 94025
Filed Feb. 23, 1965, Ser. No. 434,557
Int. Cl. F17b 1/20, 1/08
U.S. Cl. 48—178
7 Claims

ABSTRACT OF THE DISCLOSURE

There is disclosed a dry-seal pressure-type gasholder including an annular side wall within which is disposed a piston and one or more fender and backstop structures disposed between the side wall and the piston with sealing curtains interconnecting the adjacent ones of the side wall and the fender and backstop structures and the piston, a first set of hooks pivotally mounted on the fender and backstop structure adjacent to the piston and engageable therewith so that lifting of the piston lifts the adjacent fender and backstop structure, and other sets of hooks pivotally mounted on the other fender and backstop structures and engageable with the adjacent fender and backstop structure disposed inwardly with respect thereto to be lifted thereby.

---

The present invention relates to gasholders of the type comprising a cylindrical container having a vertically movable piston therein forming the top wall of the storage chamber of the gasholder, and having between the container side wall and the piston a fender and backstop structure of cylindrical configuration arranged in the space therebetween. The invention is concerned more particularly with improved means for lifting the fender and backstop structure from the piston as the piston rises in response to the introduction of gas into the storage chamber of the gasholder.

It is a general object of the invention to provide an improved gasholder of the type having a piston which rises and falls with the entry and exit of gas from the storage chamber in the gasholder, and in which in large capacity gasholders a cylindrical fender and backstop structure is arranged concentrically around the piston, and within the side wall of the container, the fender and backstop structure being connected to the piston and the container side wall respectively by flexible curtain-like sealing means, the fender and backstop structure being lifted by the piston by means of a plurality of hook structures.

A further object of the invention is to provide a gasholder of the above character in which the plurality of hooks are spaced circumferentially around the piston and carry the load in tension and exert a centering force between the piston and the fender and backstop structure and which will avoid any entanglement problems.

A further object of the invention is to provide a gasholder of the above character in which the hook structure enables movement of the piston closer to the roof of the gasholder and thereby provides space between the adjacent fender and backstop structure and the roof for head room for an individual or a guard rail around the fender and backstop structure as required in some states for safety.

Still another object of the invention is to provide a hook lifting structure for the fender and backstop structure of a gasholder in which a reduced height of the gasholder is required for the same capacity as when cables are used in place of the hooks.

Still another object of the invention is to provide lifting means for a fender and backstop structure of a gasholder which holds to a minimum the amount of radial space required between the piston and the inner fender and backstop structure.

A still further object of the invention is to provide lifting means for the fender and backstop structures of a gasholder, which lifting means are capable of prefabrication in the shop for accuracy so that no major adjustment will be needed when installed in the gasholder.

The above and other objects of the invention will be apparent from the following description of certain preferred embodiments of the invention, taken in connection with accompanying drawings in which:

FIGURE 1 is a fragmentary vertical sectional view showing a gasholder made in accordance with the present invention and showing the positions of the parts when the central piston and two fender and backstop structures are elevated to the full extent;

FIG. 2 is a view similar to FIG. 1 showing the position of the parts when the gasholder is slightly over half full of gas;

FIG. 3 is a view similar to FIGS. 1 and 2 but showing the relation of the parts when the gasholder is almost empty;

FIG. 4 is a sectional view similar to FIGS. 1, 2 and 3, but on a larger scale, showing the parts in the lowermost position of the piston when the gasholder is empty;

FIG. 5 is a fragmentary vertical sectional view illustrating a modified form of the invention where rigid lift members or hooks are associated with both the piston and the adjacent fender and backstop structure;

FIG. 6 is a view similar to FIG. 5 showing the hooks engaged with both the piston and the fender and backstop structure in operative relation to perform their lifting function;

FIG. 7 is a fragmentary vertical sectional view showing a gasholder of slightly smaller capacity wherein a single fender and backstop structure is placed intermediate the piston and the outer wall; the parts are shown in full lines in their lowermost or "down" positions with the tank substantially empty and being shown in phantom lines in their uppermost or "up" positions with the gasholder substantially full;

FIG. 8 is a fragmentary enlarged side elevational view, partially in section, of the hook structure of this invention; and FIG. 9 is a view at right angles to FIG. 8 of the hook structure showing the parts as viewed from the left of FIG. 8.

Referring to FIGS. 1, 2, 3 and 4 there is shown a cylindrical gasholder including a cylindrical side wall 10, a bottom wall 11 and a dome roof 12. Within the cylindrical side wall 12 there is a conventional piston 13 which is surrounded by an inner fender and backstop structure 14 and an outer fender and backstop structure 18, the piston 13 and the two fender and backstop structures 14 and 18 being connected respectively by sealing curtains 16, 17 and 19. The piston 13 has an outer backstop wall 13a and a bottom wall 13b. The inner backstop and fender structure 14 includes an inner backstop surface 14a for the sealing curtain 16 which is connected to the bottom edge of the piston 13 and to the bottom edge of the inner backstop surface 14a intermediate the height of the fender and backstop structure 14, and an outer backstop surface 14b for the sealing curtain 17 connected to the bottom of the fender and backstop structure 14 and to the outer backstop structure 18 at an intermediate point 18a thereof. The fender and backstop structure 18 has an upper backstop surface 18b for the sealing curtain 17 and a lower backstop surface 18c for the sealing curtain 19. The sealing curtain 19 is connected to the bottom end of the lower backstop surface 18c and to the side wall 10 to complete the seal for the gas stored within the chamber. At the various points of lines of attachment of the sealing curtains 19, 17 and 16, suitable sealing bars are used in a conventional way to connect them in gas tight fashion to the respective surfaces to which they are attached.

In order to lift the outer fender and backstop structure 18 from the inner fender and backstop structure 14, a series of circumferentially spaced cables 21 are provided in conventional fashion. Each cable is connected by means of a turnbuckle 22 to a bracket 23 on the outside wall of the upper backstop surface 18b, and at its other end each cable 21 is connected to an upstanding anchor 24 mounted on the upper fender and backstop structure 14.

The upper fender and backstop structure 14 also provides a mounting in a manner later specifically described for a circumferential series of hook structures 26 which overlie and are engaged by a cylindrical backstop wall 13a of the piston 13. In effect starting from FIG. 4 where the parts are shown in the collapsed condition with little or no gas pressure in the gasholder, the piston 13 is shown in its lowermost position where it is vertically aligned with but spaced below the hook structures 26. The cable 21 extends upwardly from the turnbuckle 22 over the top of the upper backstop surface 18b and thence downwardly to the anchor 24 on the inner fender and backstop structure 14. The sequential position of the parts is shown through FIGS. 3, 2 and 1 as they continue to rise. The piston 13 first engages the hooks 26 in lifting the fender and backstop structure 14, and gradually the cables 21 become tight and lift the outer fender and backstop structure 18.

Referring to FIGS. 5 and 6 there is shown another preferred form of the invention wherein identical hooks are provided both for lifting the inner fender and backstop structure 14 from the piston 13, and also for lifting the outer fender and backstop structure 18 from the inner fender and backstop structure 14. The outer series of hooks 31 are carried by the outer fender and backstop structure 18 on a wall 18d at the upper end thereof, and for each hook 31, there is provided a hooking station in the form of gas tight recess or pocket 32 in the outer backstop surface 14b. Each pocket 32 provides a hooking lip 33 for engagement by the cooperating hook 31, an upper inclined cam wall 34 along which the hook 31 may slide into and out of hooking engagement with the hooking lip 33. The pocket and hook construction provides for easy reengagement of the hook 31 and the hooking lip 33, the rounded cam nose 36 of the hook 31 cooperating with the inclined cam wall 34 of each pocket 32. In order to prevent undesired engagement of the hook 31 (FIG. 5) with the backstop structure 14 there is provided an inclined plate 37 at the top of the fender and backstop structure 14 which is in line with the hook 31 and will guide the hook 31 above and below the upper edge of the backstop structure 14 without allowing its engagement. For installation of hooks 31 in gasholders where the fender and backstop structures 14 and 18 are already installed, the hook 31 can be made longer and engaged over a hook lip provided, for example, in the same position as the safety inclined plate 37, but, in a vertical position so that the hook 31 will overlie and engage in lifting operation therewith. However the short hook shown in the drawings would be required where the hook length is about 30 ft. or over.

With this construction the only annular space required between the annular fender and backstop structures 14 and 18 is the necessary space for clearance between the reciprocating parts and for the U-bend turning of the flexible sealing curtains 16 and 17 between the two fender and backstop structures 14 and 18 as shown in FIG. 5.

Referring to FIG. 7 there is shown a gasholder of slightly smaller capacity wherein there is a single fender and backstop structure 14 between the side wall 10 and the piston 13 and the parts have been given similar numbers for the sake of clarity. The operation of this particular embodiment is believed obvious.

Referring to FIGS. 8 and 9 there is shown a specific hook construction of a preferred form wherein the body of the hook comprises a T-bar 41, which has a rounded upper end as seen in FIG. 8, and has welded thereto a hook nose 42 also of T-bar construction. At the bottom the T-bar 41 is welded to a plate 43 (FIG. 9) which extends to either side of the T-bar 41 and provides support for a pair of welded screw members 44, each forming a part of a turnbuckle assembly 46. The lower eye member 47 of each turnbuckle is pivoted on a bolt 48 supported in respective pairs of pivot lugs 49 carried by the upper wall 50 of the fender and backstop structure 14. Attached to the top of this fender and backstop structure 14 is a movement limit or control cable 51, which is connected through an aperture 52 in the T-bar 41 so as to limit its inward pivoting movement when in overlying position with respect to the piston 13, for example, as seen in FIG. 7.

The hook structure is fabricated of conventional metal structural parts and can be constructed in the shop by using a template so that accurate reproduction of the various hook structures is possible. The hooks can be preadjusted in the shop to the exact required length between the pivotal axis of the pivot lug 49, and the point of engagement of the hook nose 42 with the cylindrical railing 53 of the piston 13. In this way a minimum adjustment of hook structures upon assembly in the gasholder is required.

While I have shown and described a preferred embodiment of the invention, it is apparent that the invention is capable of variation and modification so that the scope thereof, should be limited only by the proper scope of the claims appended hereto.

What I claim is:

1. A gasholder comprising a container having a substantially vertical cylindrical side wall, a vertically movable piston therein spaced from said side wall and forming one end wall of a gas storage chamber, a vertically movable cylindrical fender and backstop structure arranged in the space between said piston and the side wall of said container, a first flexible sealing curtain attached at its outer edge to the side wall of said container and at its inner edge to said vertically movable fender and backstop structure, a second flexible sealing curtain attached at its outer edge to said vertically movable fender and backstop structure and at its inner edge to said piston, and a plurality of hooks pivotally mounted on and arranged in circumferentially spaced relation upon said fender and backstop structure and projecting inwardly therefrom to overlie said piston and to be engaged thereby upon lifting of said piston, whereby continued lifting of said piston effects lifting of said fender and backstop structure through said hooks.

2. A gasholder comprising a container having a substantially vertical cylindrical side wall, a vertically movable piston therein spaced from said side wall and forming one end wall of a gas storage chamber, a vertically movable cylindrical fender and backstop structure arranged in the space between said piston and the side wall of said container, a first flexible sealing curtain attached at its outer edge to the side wall of said container and at its inner edge to said vertically movable fender and backstop structure, a second flexible sealing curtain attached at its outer edge to said vertically movable fender and backstop structure and at its inner edge to said piston, a plurality of hooks pivotally mounted in circumferentially spaced relation on said fender and backstop structure and projecting upwardly and radially inwardly therefrom in tilted position to overlie said piston to be engaged thereby upon lifting of said piston, whereby continued lifting of said piston effects lifting of said fender and backstop structure through said hooks, and means for limiting the amount of tilt of each of said hooks.

3. A gas holder as recited in claim 1 in which each of said hooks comprises a rigid member having a rounded end formed with an inwardly projecting nose forming the hook portion thereof.

4. A gas holder as recited in claim 2 in which each of said hooks comprises a rigid member forming the nose of said hook, and a pair of parallel adjustable connections between said nose and said fender and backstop structure, and means for limiting the inward tilt of each of said hooks in its overlying position with respect to said piston.

5. A gas holder comprising a container having a substantially vertical cylindrical side wall, a vertically movable piston structure therein spaced from said side wall and forming one end wall of a gas storage chamber, an inner vertically movable cylindrical fender and backstop structure and an outer vertically movable cylindrical fender and backstop structure arranged in the space between said piston structure and said side wall of the container, a first flexible sealing curtain attached at its outer edge to the side wall of said container and at its inner edge to said outer vertically movable fender and backstop structure, a second flexible sealing curtain attached at its outer edge to said outer vertically movable fender and backstop structure and at its inner edge to said inner vertically movable fender and backstop structure, a third flexible sealing curtain attached at its outer edge to said inner vertically movable fender and backstop structure and at its inner edge to said piston structure, a first set of hooks pivotally mounted on and arranged in circumferentially spaced relation upon said inner fender and backstop structure, and a second set of hooks pivotally mounted on and arranged in circumferentially spaced relation upon said outer fender and backstop structure, each of said hooks projecting inwardly to overlie the adjacent one of said structures so as to be engaged and lifted thereby, whereby lifting of said piston structure in engagement with said first set of hooks effects lifting of said inner fender and backstop structure and lifting of said inner fender and backstop structure in engagement with said second set of hooks effects lifting of said outer fender and backstop structure.

6. A gasholder as recited in claim 5 in which said inner fender and backstop structure has a set of gas tight recesses formed therein for respectively receiving the individual ones of said second set of hooks.

7. A gasholder as recited in claim 5 in which said inner fender and backstop structure has a set of gas tight recesses formed therein having means respectively engageable by the individual ones of said second set of hooks, and a set of cams respectively carried adjacent to the individual ones of said recesses and respectively cooperating with the individual ones of said second set of hooks respectively to guide the same into and out of engagements with the individual ones of said recesses.

References Cited

UNITED STATES PATENTS

| | | | |
|---|---|---|---|
| 2,606,824 | 8/1952 | Allen | 48—178 |
| 2,171,567 | 9/1939 | Jagschitz | 48—178 |
| 1,752,383 | 1/1930 | Jagschitz | 48—179 |

JAMES H. TAYMAN, Jr., *Primary Examiner.*

U.S. Cl. X.R.

48—174, 176; 220—26, 85; 52—573, 2